United States Patent [19]
Chuang

[11] Patent Number: 5,370,536
[45] Date of Patent: Dec. 6, 1994

[54] VARIABLE RESISTANCE COMPUTER INPUT WHEEL

[76] Inventor: Keh-Shih K. Chuang, P.O. Box 2 - 53, Hsinchu, Taiwan, Prov. of China, 30043

[21] Appl. No.: 44,742

[22] Filed: Apr. 12, 1993

[51] Int. Cl.⁵ .............................................. G09B 9/04
[52] U.S. Cl. ...................................... 434/62; 434/45; 273/148 B; 74/552
[58] Field of Search ...................... 434/45, 62, 63, 65, 434/29, 60, 61; 273/148 B; 74/552

[56] References Cited

U.S. PATENT DOCUMENTS

| | | |
|---|---|---|
| 335,745 | 2/1886 | Valin . |
| 2,162,375 | 6/1939 | Chrisman . |
| 2,514,606 | 7/1950 | Jenny ................................ 434/45 |
| 2,741,142 | 4/1956 | Olson . |
| 2,870,548 | 1/1959 | Chedister . |
| 3,647,210 | 3/1972 | Ratcliffe . |
| 3,936,955 | 2/1976 | Gruen et al. . |
| 3,939,580 | 2/1976 | Nakano et al. . |
| 4,478,407 | 10/1984 | Manabe ......................... 434/45 X |
| 4,599,070 | 7/1986 | Hladky et al. ..................... 434/45 |
| 4,713,007 | 12/1987 | Alban ................................ 434/45 |
| 4,887,966 | 12/1989 | Gellerman ......................... 434/45 |
| 4,934,217 | 6/1990 | Biem . |

Primary Examiner—Gene Mancene
Assistant Examiner—Jeffrey A. Smith
Attorney, Agent, or Firm—Timothy T. Tyson; Joseph A. Compton

[57] ABSTRACT

Structure for varying the turning resistance of a wheel (30) via computer commands is disclosed. The structure includes springs (42) coupled to the wheel via a leverage arm (46). Commands to motors (50) move the arm attachment location of the springs.

11 Claims, 3 Drawing Sheets

VARIABLE RESISTANCE COMPUTER INPUT WHEEL

TECHNICAL FIELD

The present invitation relates generally to computer input devices and more particularly to devices responsive to computer feedback.

BACKGROUND ART

Computer input devices include keyboards, mice, trackballs, digitizing tablets, joysticks and wheels. Some input devices are structured to receive computer commands for control of a device parameter, e.g., resistance to movement. U.S. patents directed to variable resistance wheels include U.S. Pat. Nos. 335,745; 2,162,375; 2,741,142; 2,870,548; 3,647,210; 3,936,955; 3,939,580; 4,934,217 and 5,044,956.

SUMMARY OF THE INVENTION

The present invention is directed to computer input wheels which enable computer control of their turning resistance.

Apparatus in accordance with the invention are characterized by coupling of springs to the wheel through leverage arms which are changed via computer commands to motors.

In a preferred embodiment, first ends of springs are carried on radially aligned screws which are driven preferably by stepper motors. The restoring force of the springs is coupled through an axle to the wheel mounted thereon.

The novel features of the invention are set forth with particularity in the appended claims. The invention will be best understood from the following description when read in conjunction with the accompanying drawings.

DESCRIPTION OF PREFERRED EMBODIMENTS

Figure 1:
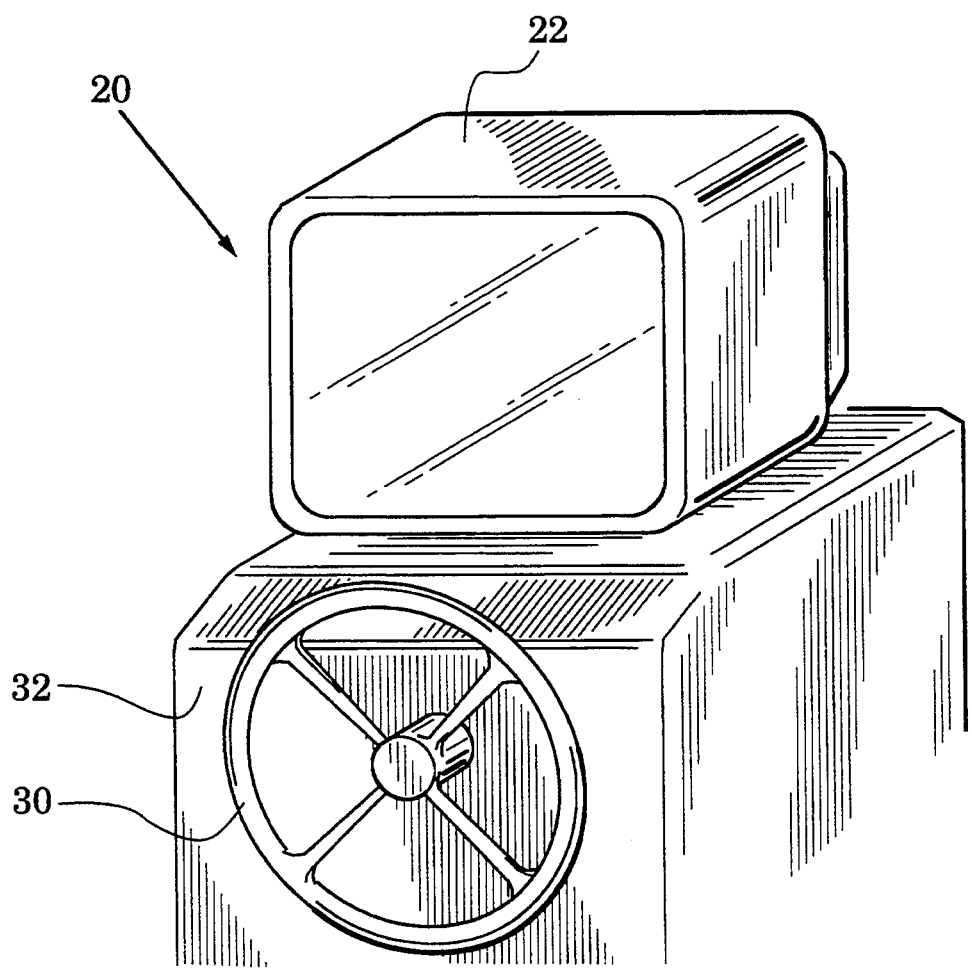
FIG. 1 is a perspective view of a computer station including a computer monitor and an embodiment, in accordance with the present invention, of a variable resistance computer input wheel.

FIG. 1 is a perspective view of a computer station 20 which includes a computer monitor 22 and, in accordance with the present invention, an embodiment of a computer controlled variable resistance wheel 30 mounted in the station housing 32.

Wheels are often used as computer input devices. For example, an apparatus for driver training may couple a wheel and other driver controls to a computer for simulation of driving situations. Interaction between student and computer is achieved via displays on the monitor 22 and movement of the wheel 30 by a student. Other activities facilitated by wheel based interactions with computers might include game playing, flight training and reaction testing.

A wheel input device can provide a two way communication path. It allows an operator to input rotary commands to the computer. In addition, the computer can command changes of an operating parameter of the wheel, e.g., varying the turning resistance. Changing the wheel's turning resistance by computer command can be useful in a variety of training and game playing situations.

The present invention is directed to computer variation of turning resistance by changing the leverage of the restoring force of springs coupled to the wheel. In the particular embodiment 40 shown in FIG. 2, which is a rear elevation view of the wheel 30 and housing 32 of FIG. 1, coil tension springs 42 are arranged between a support 44 (part of the housing 32 frame) and an arm 46. The arm 46 is coupled to the wheel 30 by an axle 48. Computer commands to motors 50 radially move the attachment points of the springs 42 on the arm 46. Thus, the computer can command the wheel 30 turning resistance to vary over a considerable range.

Figure 2:
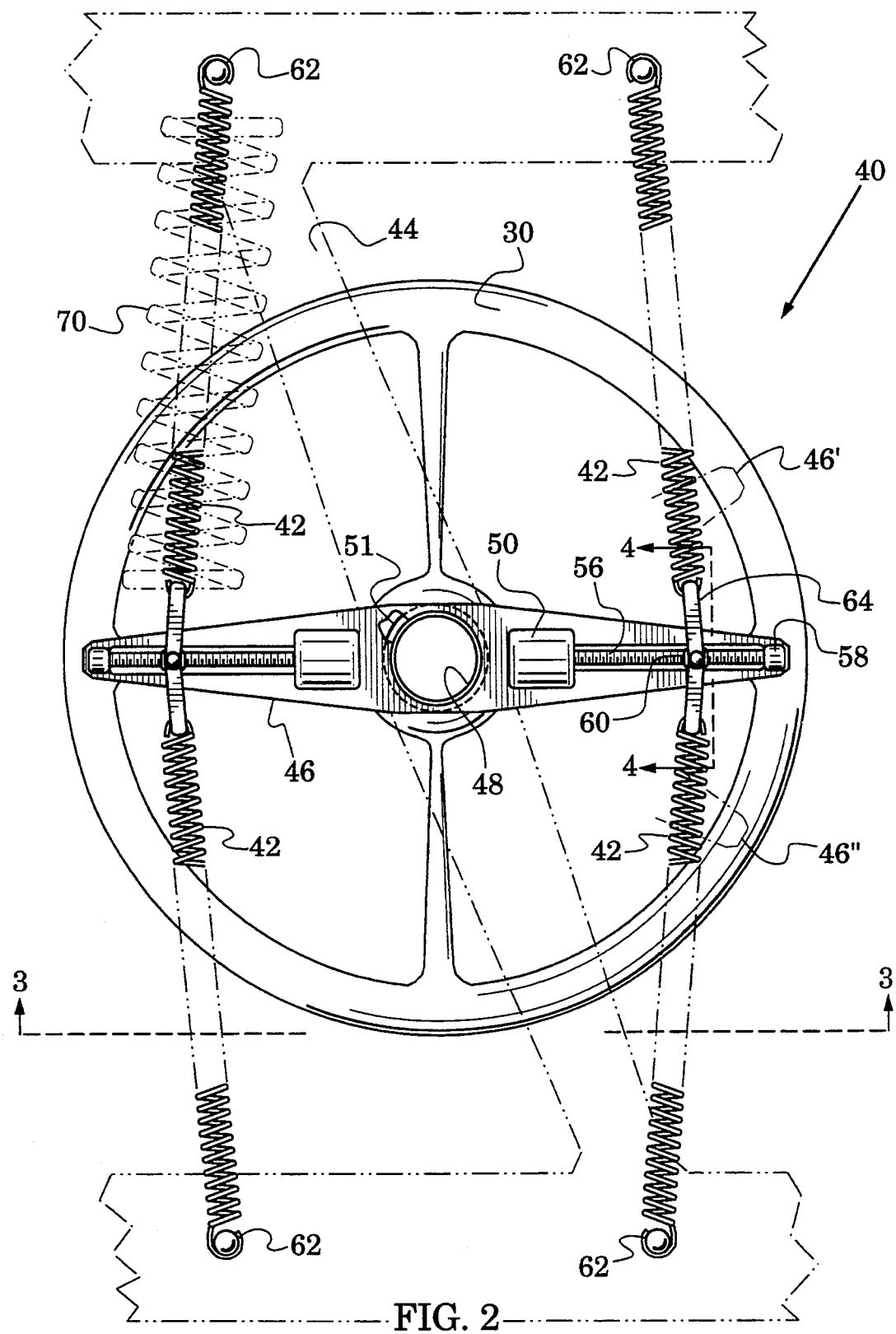
FIG. 2 is a rear elevation view of the wheel of FIG. 1 and its associated structure.
Figure 3:
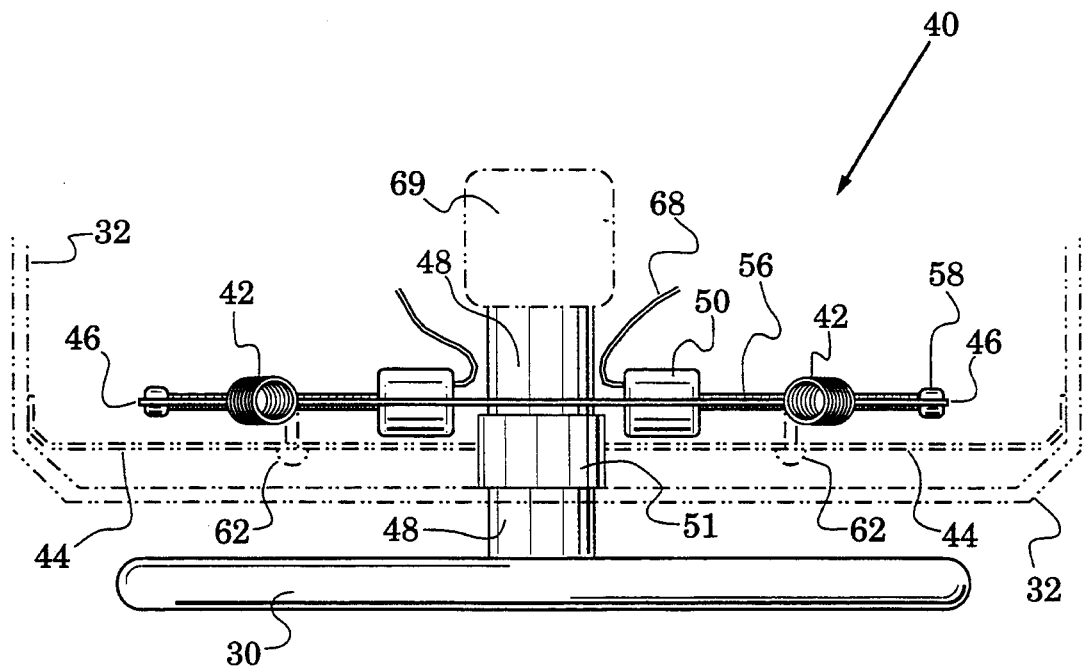
FIG. 3 is a view along the plane 3—3 of FIG. 2.
Figure 4:
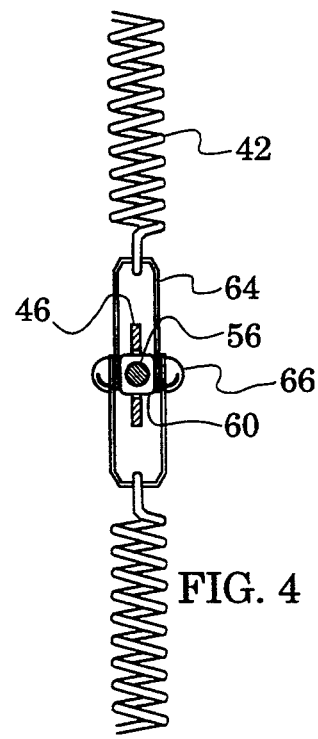
FIG. 4 is a view along the plane 4—4 of FIG. 2.

Details of the embodiment 40 may be described with the aid of FIG. 2 and FIGS. 3 and 4 which are views along the respective planes 3—3 and 4—4 of FIG. 2 (for clarity of illustration, some of the structure of these views is shown in phantom lines). Directing attention now to these figures, the wheel 30 and arm 46 are both secured to the axle 48 (attachment methods include set screws, welding, keying). The axle 48 is rotatably received through a sleeve 51 mounted in the support 44. Elongate screws 56 are rotatably mounted between bearings 58 at one end and motors 50 at the other end. The bearings 58 and motors 50 are mounted in the arm 46 to align the screws 56 radially relative to the axle 48. A threaded nut 60 rotatably receives each screw 56.

Each spring 42 is arranged with a first end attached via a pin 62 to the support 44 and a second end attached via a clevis 64 and machine screw 66 to one of the nuts 60. Thus, activating the motors 50 via computer commands through connecting wires 68 moves the nuts 60 radially which changes the leverage of each spring's restoring force on the axle 48. Preferably, the motors 50 are stepper motors whose exact rotary position can be controlled by computer command. The rotary position of the wheel 30 may be communicated to the computer via a rotary transducer 69.

In the embodiment 40, the restoring force leverage, input by the computer, varies with wheel 30 circumferential positions. For example, as rotation of the wheel moves an end of the arm 46 between positions 46', 46" in FIG. 2, the effective leverage set by a particular nut 60 position will change. However, for many uses in which wheel rotation is limited this variation is within an acceptable range.

It should be understood that the form of the support 44 shown in FIGS. 2, 3 is arbitrary as long as it can carry the axle 48 and one end of the springs 44. It should also be understood that the teachings of the invention extend to the use of various forays of springs for exerting a restoring force to the wheel 30 via the axle 48. For example, a coil compression spring 70 is shown in phantom outline over one of the springs 42 in FIG. 2. In another embodiment of the invention, the springs 42 are replaced with springs 70. Such springs can be mounted to the support 44 and nuts 60 in ways well known in the art. Other springs suitable for coupling between the support 44 and the arm 46 include blade springs and concentric springs.

From the foregoing it should now be recognized that structures have been disclosed herein especially suited for varying the turning resistance of a wheel with computer commands. The preferred embodiments of the invention described herein are exemplary and numerous modifications, dimensional variations and rearrangements can be readily envisioned to achieve an equivalent result, all of which are intended to be embraced within the scope of the appended claims.

What is claimed is:

1. A variable resistance wheel structured for computer control, comprising:
   a support;
   an axle rotatably received in said support;
   a wheel carried by said axle;
   a plurality of springs, each having first and second ends with the first end of each said springs fixed to said support and the second end of each of said springs carried by said axle; and
   means, responsive to a computer command, for moving the second end of each of said springs radially relative to said axle having:
   a motor responsive to a computer command,
   an elongate screw rotatably carried by said axle to be responsive to said motor, the axis of said screw oriented to have a radial component relative to said axle; and
   a nut receiving said screw and carrying the second end of one of said springs.

2. The variable resistance wheel of claim 1 wherein said axle defines a radially extending arm and the second end of each of said springs is carried by said arm.

3. The variable resistance wheel of claim 1 wherein said motor comprises a stepper motor.

4. The variable resistance wheel of claim 1 wherein said springs comprise coil springs arranged to be in tension.

5. The variable resistance wheel of claim 1 wherein said springs comprise coil springs arranged to be in compression.

6. A variable resistance wheel structured for computer control, comprising:
   a support;
   an axle rotatably received in said support;
   a wheel carried by said axle;
   at least one spring having first and second ends with said first end fixed to said support;
   a motor responsive to a computer command;
   at least one elongate screw responsive to said motor and rotatably carried by said axle to have a radial component relative to said axle; and
   a nut carrying said second end of said at least one spring and rotatably receiving said screw.

7. The variable resistance wheel of claim 6 wherein said at least one spring comprises at least one coil spring arranged to be in compression.

8. The variable resistance wheel of claim 6 wherein said motor comprises a stepper motor.

9. The variable resistance wheel of claim 6 wherein said at least one spring comprises at least one coil spring arranged to be in tension.

10. A method of varying the turning resistance of a wheel with a computer command, comprising the steps of:
    carrying said wheel on an axle;
    rotatably receiving said axle in a support;
    providing a plurality of springs each having first and second ends;
    fixing the first end of each of said springs to said support;
    carrying, with said axle, an elongate screw oriented with a radial component relative to said axle;
    receiving said screw with a nut;
    attaching the second end of at least one of said springs to said nut; and
    driving said screw with a motor responsive to a computer command.

11. The method of claim 10 wherein said motor comprises a stepper motor.

* * * * *